(12) United States Patent
Bindl

(10) Patent No.: US 9,358,880 B2
(45) Date of Patent: Jun. 7, 2016

(54) TANDEM DIFFERENTIAL FOR A BOGEY APPLICATION

(71) Applicant: DEERE & COMPANY, Moline, IL (US)

(72) Inventor: Reginald M. Bindl, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/549,880

(22) Filed: Nov. 21, 2014

(65) Prior Publication Data

US 2015/0165898 A1  Jun. 18, 2015

Related U.S. Application Data

(60) Provisional application No. 61/915,546, filed on Dec. 13, 2013.

(51) Int. Cl.
| | |
|---|---|
| *B60K 17/16* | (2006.01) |
| *B60K 17/342* | (2006.01) |
| *B60K 17/36* | (2006.01) |
| *F16H 48/10* | (2012.01) |

(52) U.S. Cl.
CPC .............. *B60K 17/16* (2013.01); *B60K 17/36* (2013.01); *F16H 48/10* (2013.01); *B60K 17/342* (2013.01); *B60Y 2200/411* (2013.01)

(58) Field of Classification Search
CPC .... B60K 17/16; B60K 17/348; B60K 17/342; B60K 17/346; B60K 17/36; F16H 48/10; F16H 48/102; F16H 48/104; F16H 48/106; F16H 48/108; B60Y 2200/41; B60Y 2200/417; B60Y 2200/411; B60Y 2400/73; B60Y 2400/732

See application file for complete search history.

(56) References Cited

U.S. PATENT DOCUMENTS

| | | | | |
|---|---|---|---|---|
| 1,608,069 A | * | 11/1926 | Lacey | B60K 17/36 180/24.05 |
| 1,741,425 A | * | 12/1929 | Masury | B60K 17/36 180/24.05 |
| 1,812,819 A | * | 6/1931 | Wollensak | B60K 17/36 180/24.09 |

(Continued)

FOREIGN PATENT DOCUMENTS

| | | |
|---|---|---|
| DE | 102011079975 A1 | 1/2013 |
| DE | 102011087570 A1 | 6/2013 |

(Continued)

OTHER PUBLICATIONS

European Patent Office; "Extended European Search Report"; dated May 5, 2015; 10 pages.

*Primary Examiner* — Laura Freedman
(74) *Attorney, Agent, or Firm* — Taft Stettinius & Hollister LLP; Stephen F. Rost

(57) ABSTRACT

The present disclosure provides a tandem axle for a machine. The tandem axle includes a first wheel end adapted to receive a first wheel and a second wheel end adapted to receive a second wheel. The second wheel end is spaced from the first wheel end. A bogey assembly is coupled between the first wheel end and the second wheel end. The bogey assembly includes a planetary differential disposed along a main axis and is individually coupled to the first and second wheel ends. The planetary differential includes an input for receiving power along the main axis and a first output and a second output such that the first output is coupled to the first wheel end for transferring power to the first wheel end and the second output is coupled to the second wheel end for transferring power to the second wheel end.

16 Claims, 6 Drawing Sheets

(56) References Cited

U.S. PATENT DOCUMENTS

| | | | | |
|---|---|---|---|---|
| 1,839,785 A * | 1/1932 | Church | ............... | B60K 17/36 180/24.05 |
| 2,322,279 A * | 6/1943 | Collender | ............... | B60K 17/36 180/24.11 |
| 2,402,266 A * | 6/1946 | Williams | ............... | B60K 17/36 180/24.11 |
| 2,824,615 A * | 2/1958 | Lado | ............... | B60K 17/342 180/24.05 |
| 2,878,883 A * | 3/1959 | Le Roy France | ..... | B60F 3/0007 180/23 |
| 3,127,791 A * | 4/1964 | Roe | ............... | F16H 37/00 475/10 |
| 3,976,154 A | 8/1976 | Clark et al. | | |
| 4,064,956 A * | 12/1977 | Wildey | ............... | B60G 5/02 180/24.05 |
| 4,560,018 A | 12/1985 | Satzler | | |
| 4,644,823 A | 2/1987 | Mueller | | |
| 5,290,201 A * | 3/1994 | Tesker | ............... | A01D 41/02 180/24.11 |
| 5,417,297 A | 5/1995 | Auer | | |
| 6,036,611 A * | 3/2000 | Bigo | ............... | B60K 17/36 474/146 |
| 6,805,210 B2 * | 10/2004 | Panizzolo | ............... | B60K 17/36 180/24.08 |
| 7,000,724 B2 * | 2/2006 | Lamela | ............... | B60G 5/02 180/24.05 |
| 7,291,083 B2 * | 11/2007 | Almaguer | ............... | B60K 17/36 180/249 |
| 8,056,662 B2 * | 11/2011 | Schoon | ............... | B60K 1/02 180/245 |
| 8,480,532 B2 * | 7/2013 | Biermann | ............... | F16H 48/10 475/252 |
| 8,622,407 B1 * | 1/2014 | Van Dyke | ............... | B60G 5/02 180/24.09 |

FOREIGN PATENT DOCUMENTS

| | | |
|---|---|---|
| DE | 102012204364 A1 | 9/2013 |
| EP | 2657059 A1 | 10/2013 |

* cited by examiner

TANDEM DIFFERENTIAL FOR A BOGEY APPLICATION

RELATED APPLICATION

This application claims priority to U.S. Provisional Patent Application Ser. No. 61/915,546, filed Dec. 13, 2013, which is hereby incorporated by reference in its entirety.

FIELD OF THE DISCLOSURE

The present disclosure relates to an axle arrangement, and in particular to an interaxle differential disposed within a bogey structure.

BACKGROUND OF THE DISCLOSURE

Work vehicles, such as a motor grader or forestry machines, often operate in difficult terrain. A tandem axle can be incorporated into the motor grader to provide the transmission of power to front and rear wheels on one side of the axle. Tandem axles can include gear drives or chain drives to transfer power to the wheels mounted to the axle. When a work vehicle is driving over a tree stump or debris, for example, there may be a need for one wheel to be driven faster to move the vehicle along. In conventional tandem axle systems, however, a mechanical connection (e.g., dual sprockets or gears) between wheel ends is such that the main axle turns at a defined speed that is the same for both the front and rear axles.

As a result, there can be a substantial reduction in power consumption in many conventional tandem axle designs if the different wheels in a bogey assembly are not constrained to the other wheels. Moreover, some tandem axle designs may require different diameter wheels to be mounted at the front end and rear end of the axle. In this instance, however, the difference in wheel diameters can cause the wheels to fight one another when the vehicle is driving over rough terrain. This is again due to the mechanical connection between the main axle and the front and rear axles of the tandem axle. In other words, an external component may prevent the front and rear axles from operating at the same speed which results in inefficiencies and power losses in the bogey assembly. To resolve or overcome this power reduction, other conventional drive systems may include individual wheel motors mounted at each wheel to correct or compensate for wheel speed differences. This, however, can significantly increase the cost of the machine design without providing for optimal vehicle performance.

SUMMARY

In one embodiment of the present disclosure, a tandem axle for a machine includes a first wheel end adapted to receive a first wheel and a second wheel end adapted to receive a second wheel. The second wheel end is spaced from the first wheel end. A bogey assembly is coupled between the first wheel end and the second wheel end. The bogey assembly includes a planetary differential disposed along a main axis and is individually coupled to the first and second wheel ends. The planetary differential includes an input for receiving power along the main axis and a first output and a second output such that the first output is coupled to the first wheel end for transferring power to the first wheel end and the second output is coupled to the second wheel end for transferring power to the second wheel end.

In one aspect of this embodiment, the planetary differential includes a first carrier, a second carrier, a first plurality of planet gears, a second set of planet gears, a first sun gear, and a second sun gear. Here, one of the first carrier and second carrier comprises the input. Moreover, the first sun gear comprises the first output and the second sun gear comprises the second output. In another aspect, the first plurality of planet gears is disposed in contact with the second plurality of planet gears. In a different aspect, the first sun gear and second sun gear are substantially identical to one another.

In a further aspect of this embodiment, the planetary differential does not include a ring gear. In yet another aspect, the first sun gear comprises a first width and each of the first plurality of planet gears comprises a second width, where the first width is less than the second width. In a related aspect, the tandem axle can include a first transfer mechanism and a second transfer mechanism. The first transfer mechanism can be coupled between the first sun gear and the first wheel end and is adapted to transfer power from the first sun gear to the first wheel end. The second transfer mechanism can be coupled between the second sun gear and the second wheel end and is adapted to transfer power from the second sun gear to the second wheel end. In addition, the first and second transfer mechanisms can include a chain drive or gear drive.

In another embodiment, a bogey assembly is provided for a tandem axle supporting a first wheel and a second wheel. The bogey assembly includes a first wheel-powered member disposed about a first axis and a second wheel-powered member disposed about a second axis. The first wheel-powered member is adapted to transfer power to the first wheel and the second wheel-powered member is adapted to transfer power to the second wheel. The first axis and second axis can be substantially parallel to one another. The bogey assembly further includes a planetary differential coupled between the first wheel-powered member and the second wheel-powered member. Here, the planetary differential is aligned with the first and second wheel-powered members along a third axis. The planetary differential comprises a carrier, a first plurality of planet gears, a second plurality of planet gears, a first sun gear, and a second sun gear.

In one aspect, the carrier is coupled to an input of the bogey assembly and the first and second sun gears are coupled to an output of the bogey assembly. In another aspect, the first sun gear is individually coupled to the first wheel-powered member and the second sun gear is individually coupled to the second wheel-powered member. In a different aspect, the first plurality of planet gears and the second plurality of planet gears contact one another within the planetary differential. In a further aspect, the planetary differential does not include a ring gear. Moreover, the first sun gear has a first width and each of the first plurality of planet gears has a second width, the first width being about half the second width.

In a different embodiment, a machine having a power-generating device provides power to a plurality of wheels. The machine includes a main axle disposed along a main axis, the main axle including a first end, a second end, and an input disposed therebetween, where the input is configured to receive power from the power-generating device. The machine also includes a first tandem axle coupled at the first end and a second tandem axle coupled at the second end. The first tandem axle and second tandem axle each include a planetary differential coupled to the main axle, the planetary differential comprising a carrier, a first plurality of planet gears, a second plurality of planet gears, a first sun gear, and a second sun gear. Moreover, both tandem axles include a first wheel-powered member individually coupled to the first sun gear and a second wheel-powered member individually coupled to the second sun gear.

In one aspect of this embodiment, the differential does not include a ring gear. In another aspect, the first sun gear and second sun gear are substantially coaxially aligned with one another along the main axis. In a different aspect, the first plurality of planet gears and the second plurality of planet gears contact one another within the planetary differential. In a related aspect, the machine can include a first power transfer mechanism coupled between the first sun gear and the first wheel-powered member and a second power transfer mechanism coupled between the second sun gear and the second wheel-powered member. The first power transfer mechanism and second power transfer mechanism can include a chain drive or gear drive. Moreover, one of the first sun gear and second sun gear is configured to rotate at a first speed and the other sun gear is configured to rotate at a differential speed.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Work vehicles, such as a motor grader, can be used in construction and maintenance for creating a flat surface. When paving a road, a motor grader can be used to prepare a base foundation to create a wide flat surface for asphalt to be placed on. A motor grader can include two or more axles, with an engine and cab disposed above the axles at the rear end of the vehicle and another axle disposed at the front end of the vehicle. A blade is attached to the vehicle between the front axle and rear axle.

Figure 1:
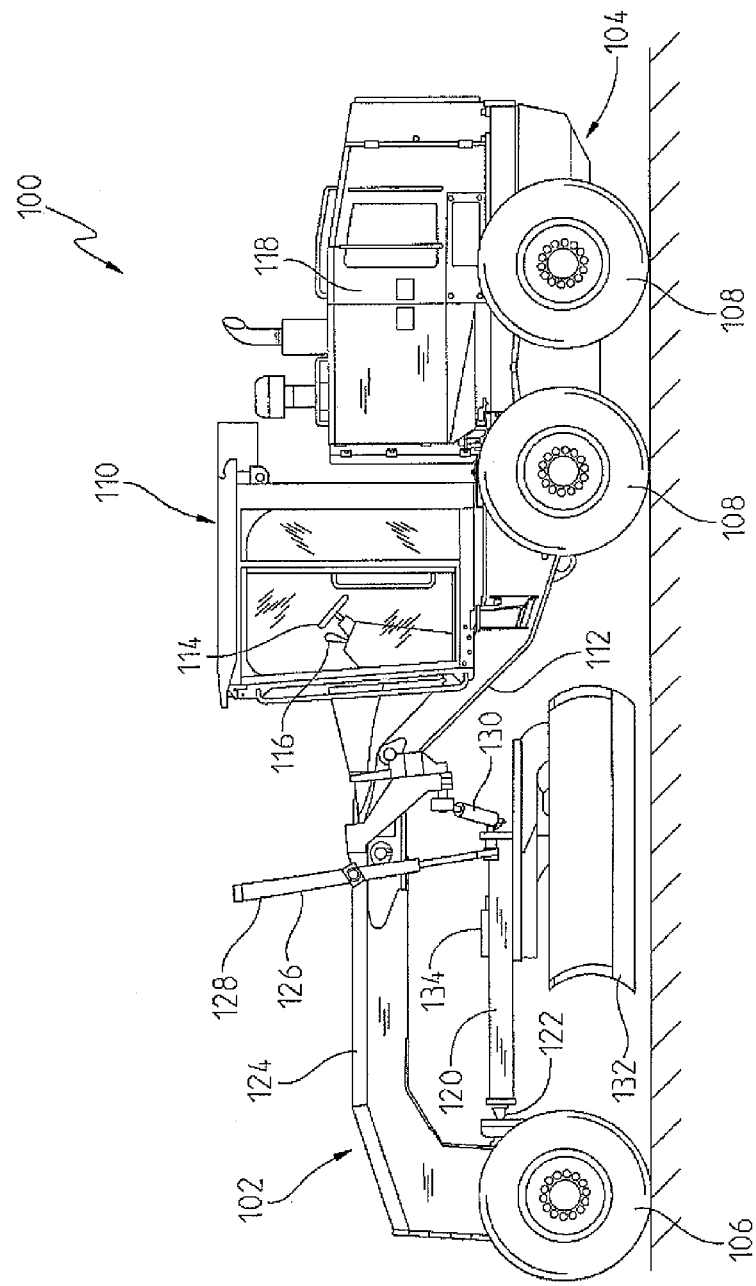
FIG. 1 is a side view of a conventional motor grader.

The present disclosure is not exclusively directed to a motor grader, but rather can extend to other powered vehicles particularly in the agricultural, construction and forestry industries. Referring to FIG. 1, a motor grader 100, such as the 772G Motor Grader manufactured and sold by Deere & Company, includes front and rear frames 102 and 104, respectively, with the front frame 102 being supported on a pair of front wheels 106, and with the rear frame 104 being supported on right and left tandem sets of rear wheels 108. An operator cab 110 is mounted on an upwardly and forwardly inclined rear region 112 of the front frame 102. The cab 110 may include various controls for controlling the motor grader 100 and which may be within the reach of a seated or standing operator. These controls may include a steering wheel 114 and a lever assembly 116. An engine 118 or power-generating device is mounted on the rear frame 104 and supplies power for all driven components of the motor grader 100. The engine 118 or power-generating device, for example, can be configured to drive a transmission (not shown), which is coupled for driving the rear wheels 108 at various selected speeds and either in forward or reverse modes. A hydrostatic front wheel assist transmission (not shown) may be selectively engaged to power the front wheels 106, in a manner known in the art.

Mounted to a front location of the front frame 102 is a drawbar 120, having a forward end universally connected to the front frame 102 by a ball and socket arrangement 122 and having opposite right and left rear regions suspended from an elevated central section 124 of the front frame 102 by right and left lift linkage arrangements including right and left extensible and retractable hydraulic actuators 126 and 128, respectively. A side shift linkage arrangement is coupled between the elevated frame section 124 and a rear location of the drawbar 120 and includes an extensible and retractable side swing hydraulic actuator 130. A blade 132 is coupled to the front frame 102 and powered by a variable displacement circle drive motor 134.

Figure 2:
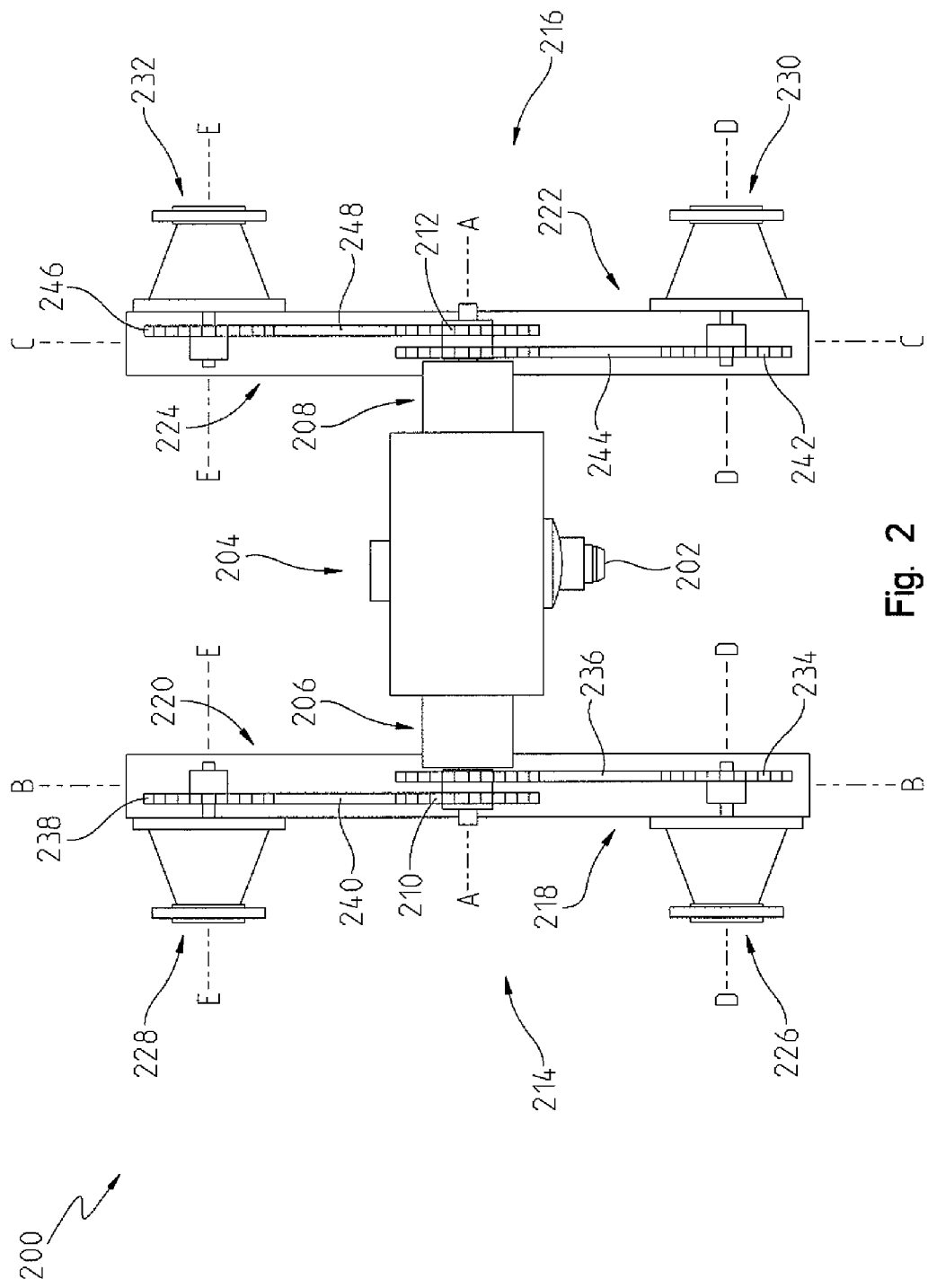
FIG. 2 is a top partial cross-sectional view of a bogey assembly.

In FIG. 1, the front wheels 106 of the motor grader 100 are mounted about a main axle on the front frame 102. However, the motor grader 100 can include a gear mechanism for a tandem axle to be disposed on both sides of the single axle. An example of such an embodiment is shown in FIG. 2. Here, a gearing mechanism 200 may include a first tandem axle 214 and a second tandem axle 216. For clarity purposes, the first tandem axle 214 is shown on the left and the second tandem axle 216 is shown on the right. The gearing mechanism 200 may also include a main axle disposed about an axis A-A. The first tandem axle 214 is disposed about an axis B-B and the second tandem axle 216 is disposed about an axis C-C. Axis A-A can be disposed perpendicular to axis B-B and axis C-C, and as such, axis B-B and axis C-C can be substantially parallel to one another.

In FIG. 2, the gearing mechanism 200 may include an input 202 that can be coupled to a main drive shaft (not shown) or transmission (not shown). The engine 118 or power-generating device, for example, can provide power to the main drive shaft (not shown) that is transferred to each wheel end of each tandem axle. A central portion 204 of the main axle may include one or more mechanisms for receiving power from the input 202 and transferring the power to each tandem axle. For instance, the central portion 204 may include a spiral bevel gearset (not shown), a brake assembly (not shown), and a final reduction assembly (not shown). Moreover, means for transferring the power to the first tandem axle 214 and second tandem axle 216 is provided. For example, the first tandem axle 214 is coupled to a first main axle portion 206. Likewise, the second tandem axle 216 is coupled to a second main axle portion 208. The first main axle portion 206 and second main axle portion 208 may each include gearing, shafts, etc. for transferring power from the central portion 204 to each tandem axle.

The first main axle portion 206 may include any conventional means for achieving this function. For instance, a shaft (not shown) may transfer power to a dual sprocket 210 that is disposed along main axis A-A and tandem axis B-B. Likewise, the second main axle portion 208 can include a shaft or other mechanism coupled to a dual sprocket 212 that is disposed along main axis A-A and tandem axis C-C. Each of the first dual sprocket 210 and second dual sprocket 212 forms part of the first tandem axle 214 and second tandem axle 216, respectively.

In FIG. 2, the first tandem axle 214 forms part of a first bogey structure that includes a first end or axle 218 and a second end or axle 220 with the dual sprocket 210 disposed therebetween. At one end of the first tandem axle 214 is a first wheel end 226 and at an opposite end thereof is a second wheel end 228. The first wheel end 226 may be disposed about axis D-D and the second wheel end 228 can be disposed about axis E-E. As shown, axes D-D and E-E may be substantially parallel to one another and to main axis A-A. Moreover, axes D-D and E-E may be substantially perpendicular to axes B-B and C-C, although in other embodiments the axes can be arranged at various angles relative to one another.

A wheel may be mounted to each of the first wheel end 226 and second wheel end 228. Power may be transferred to each wheel end by a gearing drive or chain drive. In FIG. 2, for instance, a chain drive 236 is coupled between the first dual sprocket 210 and a wheel sprocket 234. The wheel sprocket 234 can be coupled to the wheel end 226 to rotate a wheel coupled thereto. Likewise, a chain drive 240 is coupled between the dual sprocket 210 and another wheel sprocket 238 at the second end 220 of the tandem axle 214. The dual sprocket 210 may be coupled to a drive shaft disposed along main axis A-A and which forms part of the first main axle portion 206.

Similar to the first tandem axle 214, the second tandem axle 216 may be structured to include the second dual sprocket 212, a pair of wheel ends 230, 232, chain drives 244, 248, and wheel sprockets 242, 246. As shown, a third wheel end 230 is configured to drive a wheel and a fourth wheel end 232 is configured to drive a different wheel. The third wheel end 230 may be disposed along axis D-D such that it is aligned with the first wheel end 226. Likewise, the fourth wheel end 232 may be disposed along axis E-E such that the fourth wheel 232 is aligned with the second wheel end 228. The third wheel end 230 is driven by wheel sprocket 24Z whereas the fourth wheel end 232 is powered by wheel sprocket 246. Wheel sprocket 242 is disposed at one end or axle 222 of the second tandem axle 216 and wheel sprocket 246 is disposed at an opposite end or axle 224 thereof.

As shown and described with reference to FIG. 2, however, the connections between each wheel end and the dual sprockets 210, 212 is mechanical without the ability to rotate any one of the four wheel ends at a different speed (i.e., wheel end 226 at a speed different from wheel end 228). In some forestry applications, the chain drives may be replaced with gear drives that include a plurality of meshing gears disposed between each wheel end and the main axis A-A. Nevertheless, the problems inherent in both designs remain as the connections are mechanical and do not allow either wheel coupled to the tandem axle to rotate independently of the other wheel.

To achieve better efficiency and vehicle performance, the present disclosure provides several embodiments of differential structures that form part of the tandem axle. The embodiments of FIGS. 3-6 represent several examples of differential mechanisms for transferring variable power levels to the wheels of a tandem axle. A conventional differential is a mechanical device that can include gears for driving shafts. A differential can allow wheels to rotate at different speeds. In doing so, an input shaft rotates at a speed to drive gears which in turn drive a pair of output shafts. Therefore, the present disclosure provides a tandem axle with a differential mechanism that can rotate two wheels coupled at opposite ends of the tandem axle at different speeds. More particularly, the present disclosure provides a differential mechanism in the form of a planetary differential. As such, the tandem axle is no longer limited in the same manner as conventional tandem axles that rely on individual power systems (e.g., electric motors) for powering each wheel.

Figure 3:
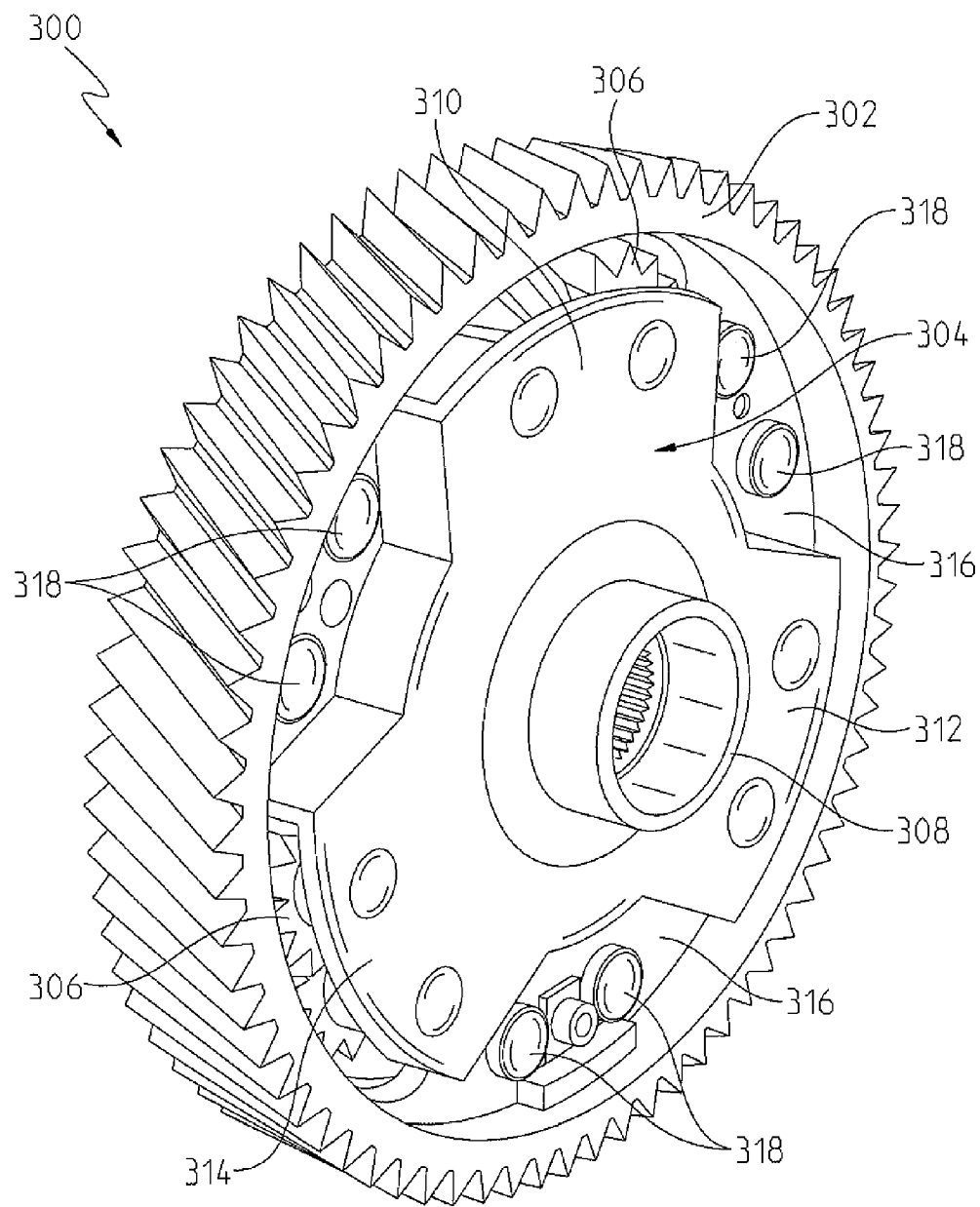
FIG. 3 is a perspective view of an example of a differential.
Figure 4:
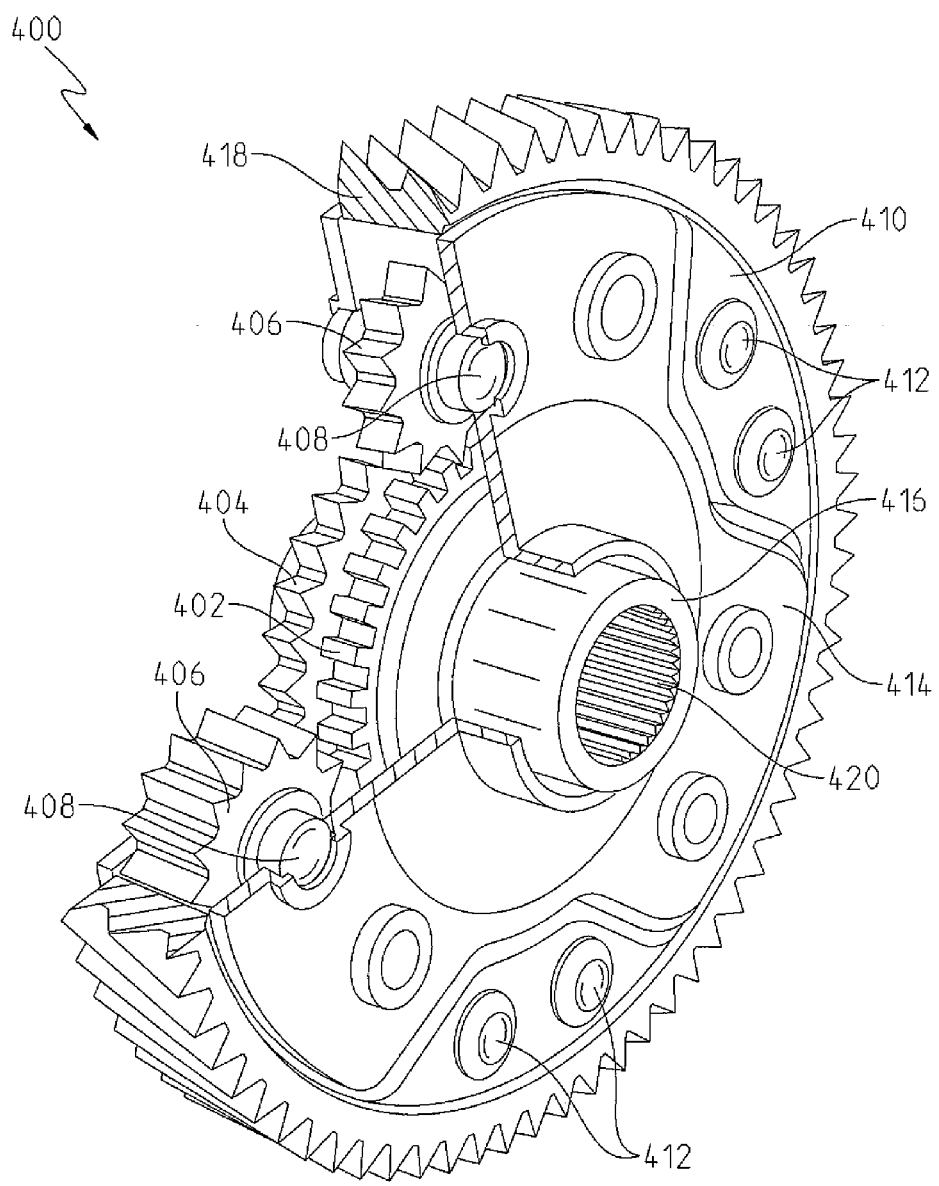
FIG. 4 is a partial perspective view of the differential of FIG. 3.
Figure 5:
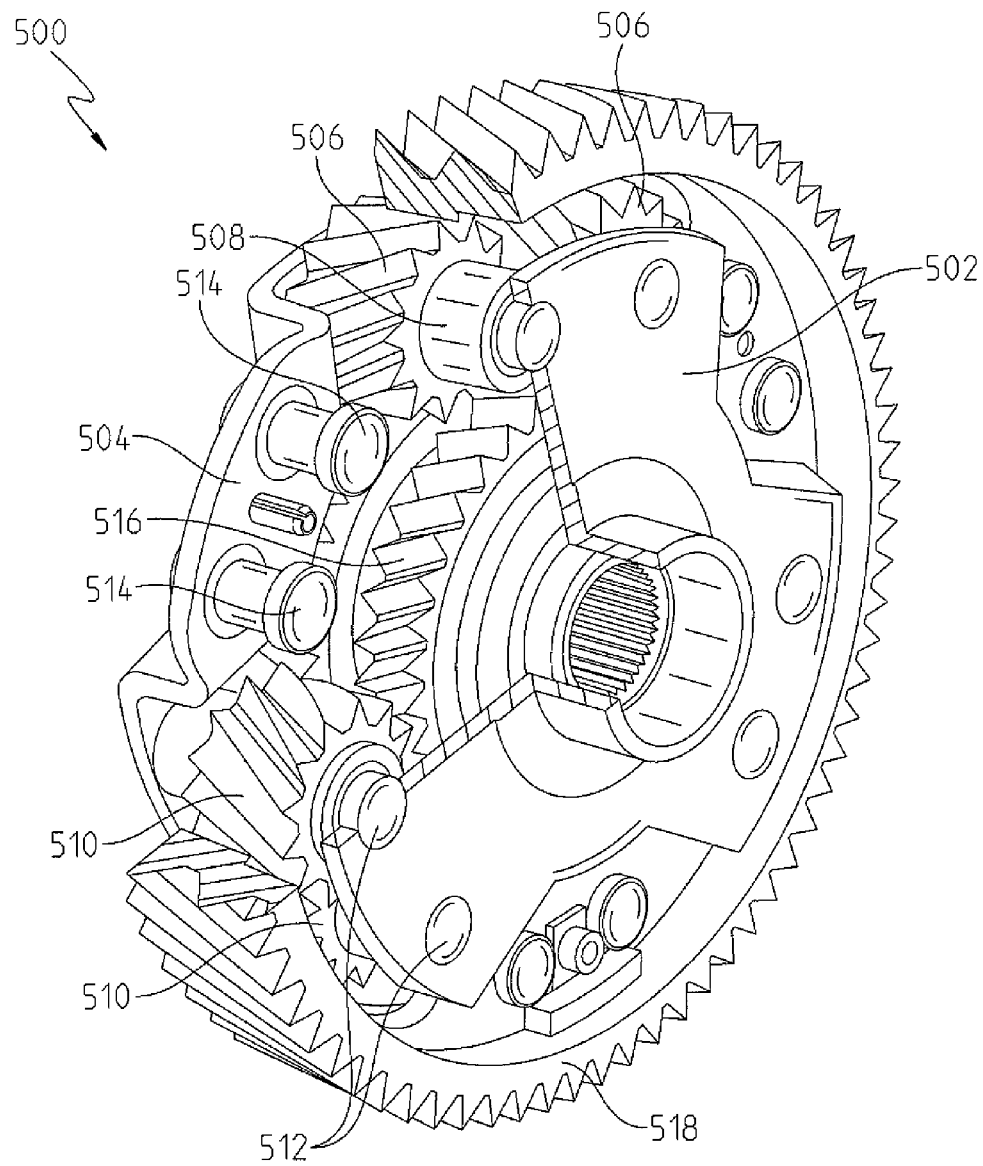
FIG. 5 is another partial perspective view of the differential of FIG. 3.

Referring to FIGS. 3-5, several embodiments of a planetary differential are shown. An example of each of these embodiments is the lightweight differential for automotive applications disclosed by Schaeffler Technologies AG & Co. as part of its INA brand. This differential is disclosed at http://www.ina.com. In FIG. 3, a planetary differential 300 is shown. The differential 300 can include an outer ring gear 302, an input carrier 304, and a plurality of planet gears 306. The input carrier 304 can include a hub 308 for coupling to an input shaft, for example. The input carrier 304 can be shaped with three prongs or arms as shown in FIG. 3. For instance, the input carrier 304 can include a first arm 310, a second arm 312, and a third arm 314. The planet gears 306 can be coupled to the carrier 304 via spindles, bearings, washers, etc. Moreover, a second carrier 316 can be disposed opposite the input carrier 304. The second carrier 316 can include a hub (not shown) for coupling to a shaft (not shown). Spindles 318 can be used to couple additional planet gears (not shown) to the second carrier or end cap 316. Although not shown in FIG. 3, the planetary differential 300 can include a first sun gear and a second sun gear. In this arrangement, the input carrier 304 or ring gear 302 can be operably connected to a vehicle driveline and thereby function as the input to the planetary differential 300. Moreover, the first and second sun gears can function as dual outputs of the differential which drive corresponding shafts (not shown) to respective wheels.

In FIG. 4, a related embodiment of the planetary differential is shown. Here, a planetary differential 400 may include a ring gear 418, a first carrier 414, a second carrier 410, and a first sun gear 402, a second sun gear 404, and a plurality of planet gears 406. As shown, the plurality of planet gears 406 are configured as spur gears disposed in a planetary gearset along a single plane. Each of the plurality of planet gears 406 (i.e., spur gears) may be coupled to the first carrier 414 via spindles 408, washers (not shown), bearings (not shown), and the like. A different set of planet gears (not shown) may be coupled to the second carrier 410 via spindles 412 and related hardware. As shown, the first sun gear 402 may be coupled to a pilot hub 416 having internal splines or teeth for engaging with an output shaft to deliver power to a wheel. Although not shown, the second sun gear 404 may also include a pilot hub (not shown) for engaging a second output shaft for delivering power to a different wheel. Similar to FIG. 3, the ring gear 418 or first and second carriers can be coupled to a vehicle driveline to deliver input torque and rotation to the planetary differential. The size of each of the plurality of planet gears 406, first sun gear 402, and second sun gear 404 may be selectively designed to deliver desired torque and rotation to each wheel along the vehicular axle.

In FIG. 5, another example of a planetary differential 500 is illustrated. Similar to the differentials of FIGS. 3 and 4, the differential 500 may include a first carrier 502, a second carrier 504, a plurality of planet gears 506, 510, a sun gear 516, and a ring gear 518. The first set of planet gears 506 may be coupled to the first and second carriers via spindles 508, bearings, washers, and the like. Likewise, the second set of planet gears 510 may be coupled to the first and second carriers via spindles 512, bearings, washers, and the like. The planetary differential 500 may also include a second sun gear (not shown) that is disposed about the same axis as the first sun gear 516. In addition, a plurality of spindles 514 and related hardware may support an additional set of planet gears (not shown). The planet gears 506, 510 in the differential 500 may be helical gears, in contrast to the spur gear design of FIG. 4. As such, the planetary differential 500 may include different types of gears based on space constraints and desired performance.

The first carrier 502, second carrier 504, or ring gear 518 may deliver input torque and rotation to the planetary differential 500. The first sun gear 516 and second sun gear (not shown) may couple output shafts for delivering power to wheels disposed at opposite ends of the axle. The differentials disclosed in FIGS. 3, 4, and 5 are optimal for automotive applications where an engine (or other power-generating device) and transmission deliver torque through a driveline or shaft to the input of the differential. The present disclosure, however, further contemplates the use of a planetary differential in a tandem axle such as the one shown in FIG. 2. In any event, a modified design of the differentials of FIGS. 3, 4, and 5 can provide desired improvements over conventional tandem axles.

Figure 6:
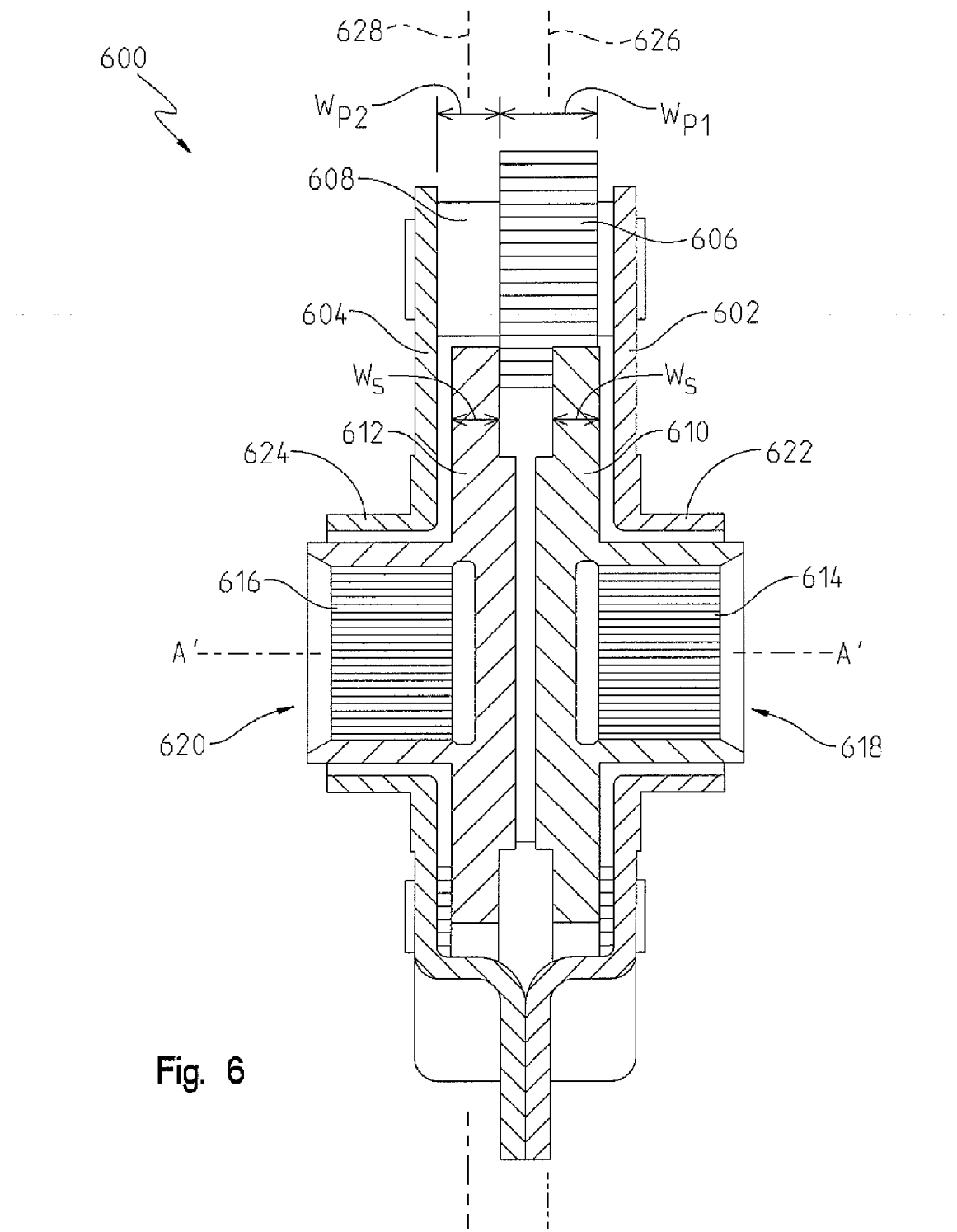
FIG. 6 is a cross-sectional view of another example of a differential for use in a bogey assembly.

Referring to FIG. 6, one embodiment is shown of a planetary differential 600 capable of being incorporated into a bogey assembly of a tandem axle. The differential 600 of FIG. 6 may be structured to replace the first double or dual sprocket 210 and second double or dual sprocket 212 of FIG. 2. In doing so, the dual sprockets are removed from the gearing mechanism 200.

In the present disclosure, the planetary differential 600 may be disposed between the axles (e.g., first axis 218 and second axis 220 of the first tandem axle 214) on the same side bogey assembly to rotate at different speeds. As to be further described, the planetary differential 600 may be a compound planetary design which includes two sun gears that act as outputs to the two axles of the bogey assembly. Input to the planetary differential 600 may be via a planetary carrier, and power may be transmitted via a plurality of planet gears to the sun gears. In this particular design, the planetary differential 600 is structured without a ring gear. A differential action between the two output sun gears may be achieved by inputting power through a common input carrier and two sets of planet gears. A first set or plurality of planet gears may mesh or engage with a first sun gear, and a second set or plurality of planet gears may mesh or engage with a second sun gear. The planet gearsets, which contact or mesh with one another in this design (and receive power from the same input carrier), may include a one-half configuration so that differential speeds may be output by the sun gears.

More specifically with reference to both FIGS. 2 and 6, the planetary differential 600 may be individually coupled to the first wheel end 226 and second wheel end 228 of the first tandem axle 214. Likewise, a second planetary differential 600 may be disposed along the same axis as the first planetary differential 600, but instead drives the third wheel end 230 and fourth wheel end 232 of the second tandem axle 216. More specifically, however, the planetary differential 600 may individually couple to each wheel end of each respective tandem axle so that both wheels coupled to opposite ends of the tandem axle may rotate at different speeds depending on driving conditions. Moreover, the use of the planetary differential 600 allows different wheel diameters to be mounted at opposite ends of the tandem axle since each wheel is rotationally driven independent of the other.

The planetary differential 600 may include a first carrier 602 disposed on a first side 618 and a second carrier 604 disposed on a second side 620 of the differential 600. The first side 618 and second side 620 are disposed opposite of one another. In one aspect, the first carrier 602 may function as the input to the planetary differential 600. In another aspect, however, the second carrier 604 may function as the input to the planetary differential 600. In particular, the first carrier 602 may include a first pilot hub 622 for coupling to a shaft or similar component of the first or second main axle portion (depending on the tandem axle). Likewise, the second carrier 604 may include a pilot hub 624 for coupling to a shaft or the like of the first or second main axle portion. In this manner, power is received by the planetary differential 600 at either or both of the first and second carriers.

Moreover, the planetary differential 600 may further include a plurality of planet gears. A first set of planet gears 606 may be disposed about a first axis 626 and a second set of planet gears 608 may be disposed about a second axis 628. The first axis 626 and second axis 628 may be substantially parallel to but offset from one another. Each of the first set of planet gears 606 may be coupled to the first carrier 602 via a spindle, bearing, washer, or other fastener. The spindle may define an axis that is substantially perpendicular to the first axis 626 and about which the planet gear 606 rotates. Similarly, each of the second set of planet gears 608 may be coupled to the second carrier 604 via a spindle, bearing, washer, or other fastener. Each of the second set of planet gears 608 may rotate about its spindle, which defines a rotational axis that is substantially perpendicular to the second axis 628.

The planetary differential 600 may also include a first sun gear 610 and a second sun gear 612. The first sun gear 610 and second sun gear 612 may be substantially the same in terms of size, shape, gear teeth, etc. Moreover, both sun gears may be aligned with one another about axis A'-A'. Referring to FIG. 2, axis A'-A' is coaxial or substantially coaxial with main axis A-A. The first sun gear 610 may be splined, coupled, or engaged with a first output shaft 614. In addition, the first sun gear 610 may be splined, coupled, or operably engaged with the first set of planet gears 606. Similarly, the second sun gear 612 may be splined, coupled, or engaged with a second output shaft 616. In addition, the second sun gear 612 may be splined, coupled, or operably engaged with the second set of planet gears 608.

Although not shown in FIG. 6, the first set of planet gears 606 may at least partially overlap with and contact the second set of planet gears 608. Therefore, torque can be transferred between the first set of planet gears 606 and the second set of planet gears 608 during operation. In addition, and in contrast to the planetary differentials shown in FIGS. 3, 4, and 5, the planetary differential 600 in FIG. 6 does not include a ring gear. Instead, power is transferred to the planetary differential 600 via one or both of the first carrier 602 and the second carrier 604. In one aspect, both carriers may receive torque. In a different aspect, one of the carriers may receive the full amount of input torque while the other carrier does not receive any portion of the input torque.

As shown in FIG. 6, the first set of planet gears 606 may include a width, $W_{P1}$, which is greater than the width, $W_{P2}$, of the second set of planet gears 608. In addition, the first sun gear 610 may include a width, $W_S$, which may be less than the width, $W_{P1}$, of the first set of planet gears 606. In one non-limiting example, the width, $W_S$, may be approximately 50% of the width, $W_{P1}$. In another example, the $W_S$ may be in the range of about 25-75% of $W_{P1}$. The aforementioned percentages are only provided as examples, and are not intended to limit this disclosure in any way. The ratio of widths, $W_S$ to $W_{P1}$, may vary depending on the work vehicle and application, but in most instances this ratio will be less than 1.0.

During operation, input torque may be received by either carrier and transferred to the rest of the gears. For instance, input torque may be transferred by the first carrier 602 to the first set of planet gears 606. Since the first set of planet gears 606 and second set of planet gears 608 overlap with one another and therefore contact one another, a portion of the input torque is transferred to both the first sun gear 610 and second sun gear 612. In the event both sun gears are rotating at the same speed, the planetary differential 600 operates in a locked-like condition in which the planet gears do not rotate. However, if one of the first sun gear 610 and second sun gear 612 rotates at a faster speed than the other, the differential speed goes to the slower rotating sun gear.

The output of the first sun gear 610 and second sun gear 612 may be individually coupled to each respective end of the tandem axle through a chain drive or gear drive as previously described. For instance, the first sun gear 610 may transfer rotational power via chain drive 236 to wheel sprocket 234 to drive the first wheel end 226. Likewise, the second sun gear 612 may transfer rotational power via chain drive 240 to wheel sprocket 238 to drive the second wheel end 228. In addition, the first sun gear 610 may individually drive the first wheel end 226 via wheel sprocket 234, whereas the second sun gear 612 may individually drive the second wheel end 228 via wheel sprocket 238. In other words, in one embodiment the first sun gear 610 is responsible for rotationally driving the first wheel end 226 and the second sun gear 612 is responsible for rotationally driving the second wheel end 228, and the arrangement of this embodiment is such that a differential speed is possible through the planetary differential 600 based on the rotational speed of one of the first sun gear 610 and second sun gear 612.

In a different aspect, the first sun gear 610 may transfer power to one of a plurality of gears of a gear drive to rotationally drive the first wheel end 226. Similarly, the second sun gear 610 may transfer power to one of a plurality of gears of a gear drive to rotationally drive the second wheel end 228. Depending on drive conditions or wheel diameter sizes, the speed at which each wheel end is driven may be controlled through the planetary differential. In at least one instance, the planetary differential 600 of FIG. 6 may reduce torque loads by approximately 50-75% over conventional dual sprocket designs. As a result, the planetary differential 600 can improve the efficiency of the work vehicle and reduce fuel consumption.

Although not shown, a different embodiment of the differential 600 in FIG. 6 may include the use of a clutch (not shown) with the differential. The clutch may be operably controlled between an engaged position and a disengaged position. In the engaged position, the clutch may mechanically couple one input to at least one output. For example, the clutch may lock the input to the output of the differential and thereby control all of the wheels at approximately the same speed. This can be useful if a front wheel and a rear wheel, for example, are rotating at different speeds due to one of the two wheels slipping. For instance, one of the wheels may lose traction due to loose gravel, ice, water, etc. and therefore slip. In the present embodiment, a difference in wheel speeds may be detected such that the clutch is engaged to lock the differential in order to reduce the speed differential between the wheels and provide increased control of the machine or vehicle.

The clutch may be hydraulically controlled in one example. An operator may be able to command the clutch to the engaged position from a location in the operator's cab. Alternatively, a controller may be in electrical communication with speed sensors on the different wheels such that the controller can monitor the wheel speeds. As such, the controller can detect a difference in measured wheel speeds, and when the difference exceeds a threshold, the controller can control the engagement of the clutch to further control the wheel speeds. Other aspects and control mechanisms besides a clutch may be used for controlling the connection between the input and one of the outputs of the differential 600.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A tandem axle for a work vehicle, comprising:
a first wheel end adapted to receive a first wheel;
a second wheel end adapted to receive a second wheel, the second wheel end spaced from the first wheel end;
a bogey assembly coupled between the first wheel end and the second wheel end, the bogey assembly including a planetary differential disposed along a main axis and individually coupled to the first and second wheel ends;
wherein, the planetary differential includes an input for receiving power along the main axis and a first output and a second output;
further wherein, the first output is coupled to the first wheel end for transferring power thereto and the second output is coupled to the second wheel end for transferring power thereto;
wherein the planetary differential comprises a first carrier, a second carrier, a first plurality of planet gears, a second plurality of planet gears, a first sun gear, and a second sun gear; and
wherein the first plurality of planet gears is disposed in contact with the second plurality of planet gears.

2. The tandem axle of claim 1, wherein one of the first carrier and second carrier comprises the input.

3. The tandem axle of claim 1, wherein the first sun gear comprises the first output and the second sun gear comprises the second output.

4. The tandem axle of claim 1, wherein the first sun gear and second sun gear are substantially identical to one another.

5. The tandem axle of claim 1, wherein the first sun gear comprises a first width and each of the first plurality of planet gears comprises a second width, the first width being less than the second width.

6. The tandem axle of claim 1, further comprising:
a first transfer mechanism coupled between the first sun gear and the first wheel end, the first transfer mechanism adapted to transfer power from the first sun gear to the first wheel end; and
a second transfer mechanism coupled between the second sun gear and the second wheel end, the second transfer mechanism adapted to transfer power from the second sun gear to the second wheel end;
wherein, the first and second transfer mechanisms include a chain drive or gear drive.

7. A tandem axle for a work vehicle, comprising:
a first wheel end adapted to receive a first wheel;
a second wheel end adapted to receive a second wheel, the second wheel end spaced from the first wheel end;
a bogey assembly coupled between the first wheel end and the second wheel end, the bogey assembly including a planetary differential disposed along a main axis and individually coupled to the first and second wheel ends;
wherein, the planetary differential includes an input for receiving power along the main axis and a first output and a second output;

further wherein, the first output is coupled to the first wheel end for transferring power thereto and the second output is coupled to the second wheel end for transferring power thereto;

wherein the planetary differential comprises a first carrier, a second carrier, a first plurality of planet gears a second set of planet gears, a first sun gear, and a second sun gear; and wherein the planetary differential does not include a ring gear.

8. A bogey assembly for a tandem axle supporting a first wheel and a second wheel, comprising:
a first wheel-powered member disposed about a first axis, the first wheel-powered member adapted to transfer power to the first wheel;
a second wheel-powered member disposed about a second axis and adapted to transfer Mower to the second wheel, where the first axis and second axis are substantially parallel to one another; and
a planetary differential coupled between the first wheel-powered member and the second wheel-powered member, the planetary differential being aligned with the first and second wheel-powered members along a third axis;
wherein, the planetary differential comprises a carrier, a first plurality of planet gears, a second plurality of planet gears, a first sun gear, and a second sun gear; and
wherein the first plurality of planet gears and the second plurality of planet gears contact one another within the planetary differential.

9. The bogey assembly of claim 8, wherein the carrier is coupled to an input of the bogey assembly and the first and second sun gears are coupled to an output of the bogey assembly.

10. The bogey assembly of claim 8, wherein the first sun gear is individually coupled to the first wheel-powered member and the second sun gear is individually coupled to the second wheel-powered member.

11. The bogey assembly of claim 8, wherein the first sun gear has a first width and each of the first plurality of planet gears has a second width, the first width being about half the second width.

12. A bogey assembly for a tandem axle supporting a first wheel and a second wheel, comprising:
a first wheel-powered member disposed about a first axis, the first wheel-powered member adapted to transfer power to the first wheel;
a second wheel-powered member disposed about a second axis and adapted to transfer power to the second wheel, where the first axis and second axis are substantially parallel to one another; and
a planetary differential coupled between the first wheel-powered member and the second wheel-powered member, the planetary differential being aligned with the first and second wheel-powered members along a third axis;
wherein, the planetary differential comprises a carrier, a first plurality of planet gears, a second plurality of planet gears, a first sun gear, and a second sun gear; and
wherein the planetary differential does not include a ring gear.

13. A machine having a power-generating device for providing power to a plurality of wheels, comprising:
a main axle disposed along a main axis, the main axle including a first end, a second end, and an input disposed therebetween, where the input is configured to receive power from the power-generating device;
a first tandem axle coupled at the first end and a second tandem axle coupled at the second end;
wherein the first tandem axle and second tandem axle each include:
a planetary differential coupled to the main axle, the planetary differential comprising a carrier, a first plurality of planet gears, a second plurality of planet gears, a first sun gear, and a second sun gear;
a first wheel-powered member individually coupled to the first sun gear; and
a second wheel-powered member individually coupled to the second sun gear; and
wherein the differential does not include a ring gear.

14. A machine having a power-generating device for providing power to a plurality of wheels, comprising:
a main axle disposed along a main axis, the main axle including a first end, a second end, and an input disposed therebetween, where the input is configured to receive power from the power-generating device;
a first tandem axle coupled at the first end and a second tandem axle coupled at the second end;
wherein the first tandem axle and second tandem axle each include:
a planetary differential coupled to the main axle, the planetary differential comprising a carrier, a first plurality of planet gears, a second plurality of planet gears, a first sun gear, and a second sun gear;
a first wheel-powered member individually coupled to the first sun gear; and
a second wheel-powered member individually coupled to the second sun gear; and
wherein the first sun gear and second sun gear are substantially coaxially aligned with one another along the main axis.

15. A machine having a power-generating device for providing power to a plurality of wheels, comprising:
a main axle disposed along a main axis, the main axle including a first end, a second end, and an input disposed therebetween, is configured to receive power from the power-generating device;
a first tandem axle coupled at the first end and a second tandem axle coupled at the second end;
wherein the first tandem axle and second tandem axle each include:
a planetary differential coupled to the main axle, the planetary differential comprising a carrier, a first plurality of planet gears, a second plurality of planet gears, a first sun gear, and a second sun gear;
a first wheel-powered member individually coupled to the first sun gear; and
a second wheel-powered member individually coupled to the second sun gear; and
wherein the first plurality of planet gears and the second plurality of planet gears contact one another within the planetary differential.

16. The machine of claim 15, further comprising:
a first power transfer mechanism coupled between the first sun gear and the first wheel-powered member; and
a second power transfer mechanism coupled between the second sun gear and the second wheel-powered member;
wherein, the first power transfer mechanism and second power transfer mechanism comprise a chain drive or gear drive;
further wherein, one of the first sun gear and second sun gear is configured to rotate at a first speed and the other sun gear is configured to rotate at a different speed.

* * * * *